United States Patent

[11] 3,600,843

| [72] | Inventor | Joseph T. Becker<br>21 West 674 Glenn Valley Drive, Glen Ellyn, Ill. 60137 |
|---|---|---|
| [21] | Appl. No. | 879,413 |
| [22] | Filed | Nov. 24, 1969 |
| [45] | Patented | Aug. 24, 1971 |

[54] TOY
10 Claims, 8 Drawing Figs.

[52] U.S. Cl. ................................................. 46/1 H,
273/98, 273/108, 46/76
[51] Int. Cl. ..................................................... A63h 33/00
[50] Field of Search ........................................... 46/1 B, 1 H,
1 J; 35/12; 46/76; 273/95 B, 98, 108

[56] References Cited
UNITED STATES PATENTS
2,388,513  11/1945  Zwickel ............................ 273/95

| 2,643,126 | 6/1953 | Kelly ........................... | 273/95 |
| 3,220,121 | 11/1965 | Cutler ......................... | 35/12 |

FOREIGN PATENTS
| 963,339 | 1964 | Great Britain ............... | 46/1 |

Primary Examiner—Louis G. Mancene
Assistant Examiner—D. L. Weinhold
Attorney—Stone, Zummer, Livingston & Aubel

ABSTRACT: A toy which is entertaining and educational in that the toy may be used to teach basic principles of landing an airplane. A model airplane having a pair of supports is slidingly supported on a monofilament support line. One end of the support line is secured to a fixed vertical support, and the other end is attached to a universally movable vertical support, which is modeled after a joystick. A landing surface is positioned below the support line. The model joystick is utilized to regulate the tautness of the support line in order to control the rate of vertical movement of the model airplane.

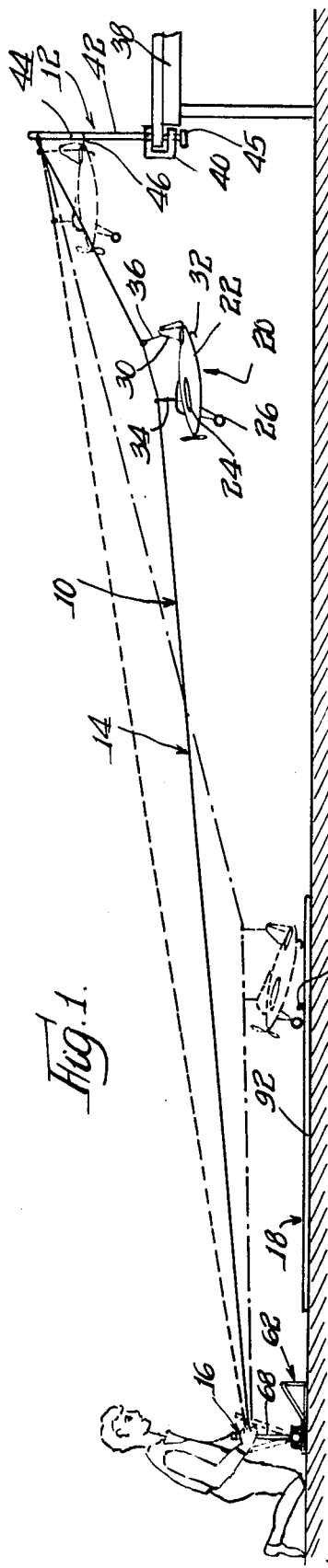
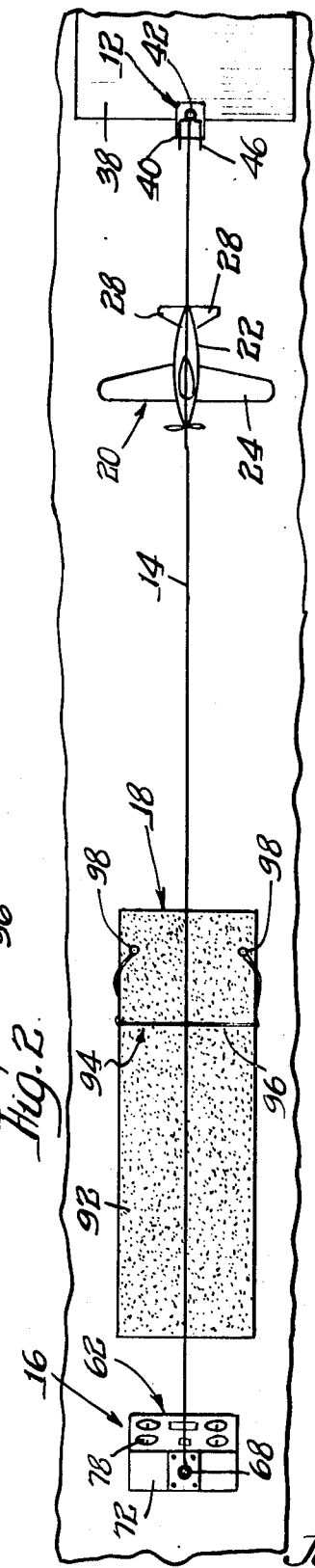
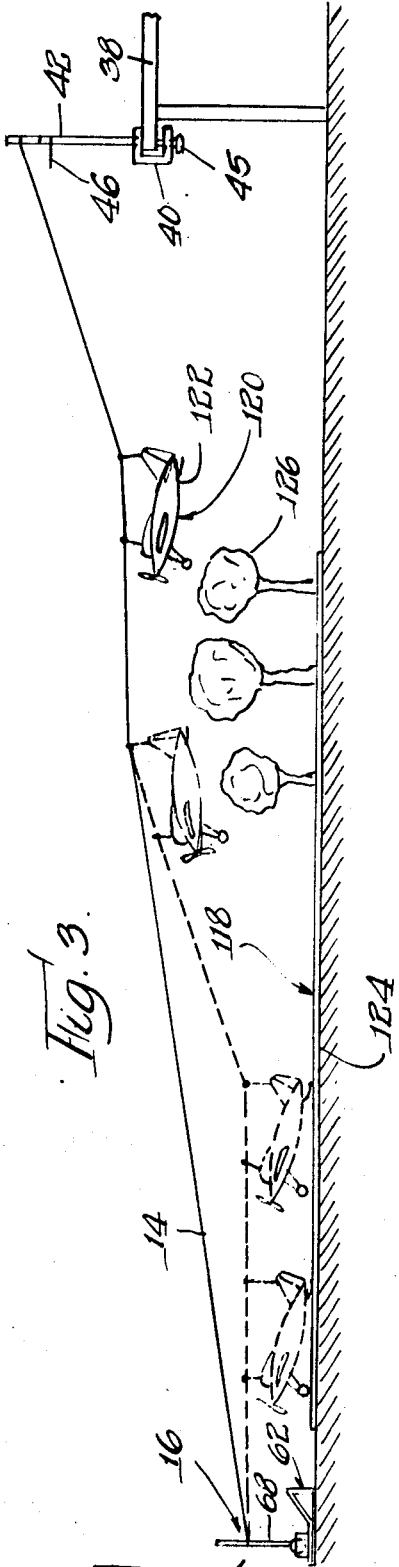
Inventor
Joseph T. Becker
By: Stone, Zummer, Livingston & Aubel attys.

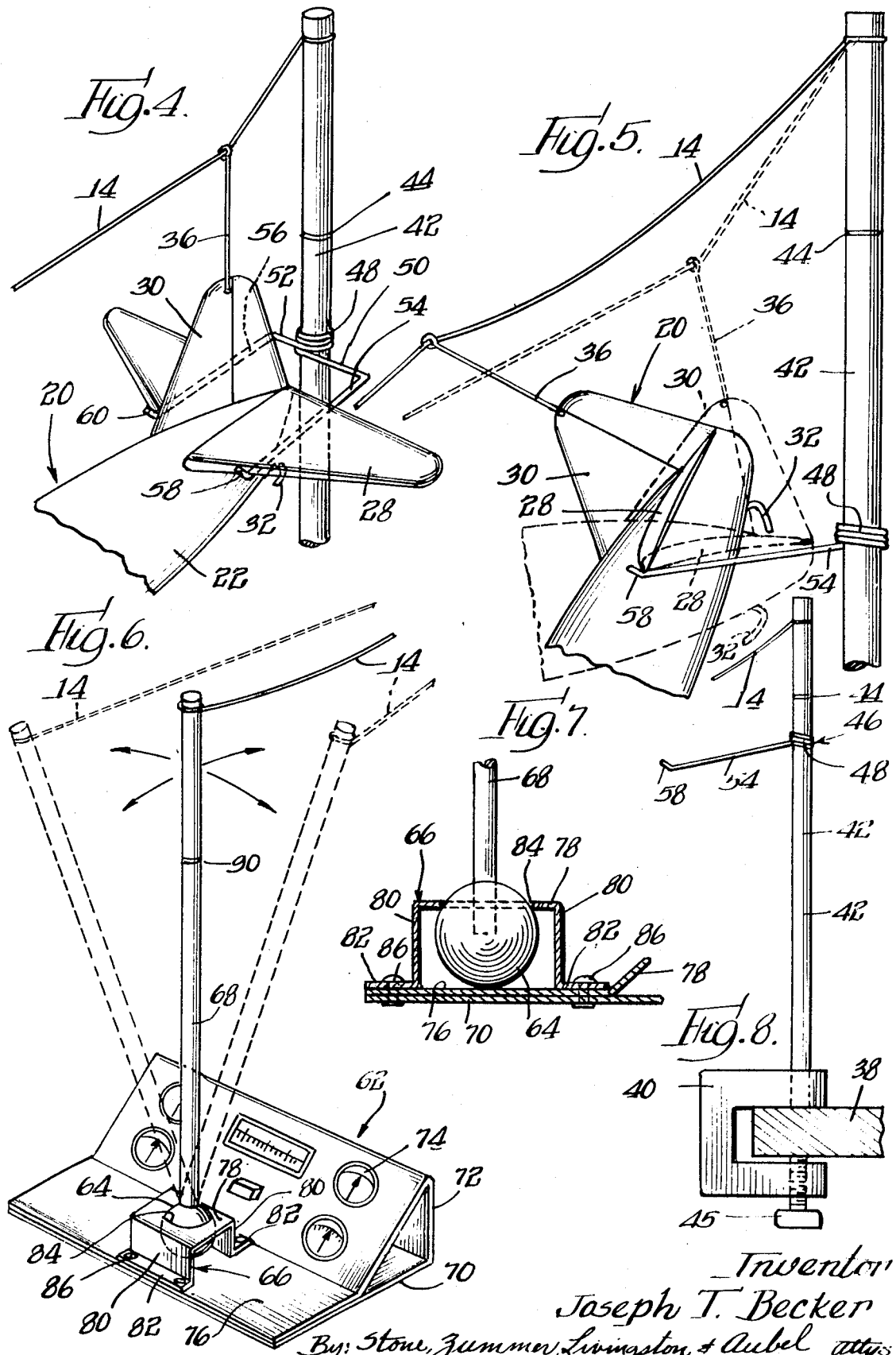

TOY

BACKGROUND OF THE INVENTION

Toys have been used heretofore to provide instruction to its operator in the form of a game. Model airplanes have been used to provide a source of entertainment for the operator. In order to simulate flight of the model planes, certain model airplanes have been mounted in various fashions on one or more support lines. The model airplanes which have been used heretofore have been so arranged as to go back and forth on a support line by raising and lowering one end of the support line. In certain instances, two lines have been used, wherein one line supported the model airplane and the other provided the means for moving the model. In other instances, the model airplane has carried a model bomb load. By shaking or appropriately moving the support line or a connecting line, the bomb load was dropped onto a target. None of the devices heretofore known provides a construction whereby the operator has the sense or simulation of actually controlling an airplane in flight.

SUMMARY OF THE INVENTION

The present invention provides an educational toy construction wherein the operator is able to simulate a landing of an airplane by controlling a model airplane during its landing. The invention includes a support line which has one end fixed to a fixed vertical support. The other end of the support line is fixed to a movable vertical support, which is arranged to simulate a joystick of an airplane. A model airplane is suspended on the support line. A landing surface is provided beneath the support line. One end of he support line is higher than the other. As the model airplane is released from the upper end of the support line, the model airplane slides along the support line. Movement of the joystick causes a response in the movement of the airplane to go up and down in a manner similar to that of an actual airplane. The operator then guides the airplane to a touchdown on the landing strip, simulating actual landing of the airplane. Takeoffs are simulated by reversing the operation of the toy.

BRIEF DESCRIPTION OF THE DRAWINGS

FIG. 1 is a side elevation of a toy embodying the herein-disclosed invention;

FIG. 2 is a plan view of the toy shown in FIG. 1;

FIG. 3 is a side elevation of a toy similar to the toy shown in FIGS. 1 and 2 but with an obstacle positioned between the starting point of movement of the model airplane and a landing surface;

FIG. 4 is a perspective view of a catch for holding a model airplane prior to descent;

FIG. 5 is a side elevation showing the model airplane being released from the catch;

FIG. 6 is a perspective view of a movable vertical support;

FIG. 7 is a cross-sectional view of a portion of the movable vertical support shown in FIG. 6 showing a ball mounting which is utilized to allow the support to move in any direction; and FIG. 8 is a side elevational view of a fixed vertical support.

DESCRIPTION OF THE PREFERRED EMBODIMENT

Referring now to the drawings, and especially to FIG. 1, a toy generally indicated by numeral 10 is shown therein, which toy is a specific embodiment of the invention disclosed herein. The toy 10 generally includes a fixed vertical support 12, a support line 14 having one end fixed to the support 12 and the other end of the line fixed to a movable vertical support 16, which is a model of a joystick. A landing strip 18 is positioned below the line 14 and adjacent to the movable vertical support 16. A vehicle, which in this case is a model airplane 20, is slidably supported on the support line 14 and is engageable with the landing surface 18.

The model airplane 20 is conventional in its construction in that it includes, a fuselage 22, wings 24 connected to the fuselage, and wheels 26 mounted on the fuselage which provide landing gear for the model airplane. The model airplane also includes a conventional horizontal stabilizer 28 and a vertical stabilizer 30. Fixed to the fuselage near the tail portion of the model airplane is a hook 32, which hook is engageable with the landing surface 18. The model airplane has a pair of wire support hooks 34 and 36 fixed thereon, which hooks 34 and 36 are in engagement with the line 14. The support hook 34 is fixed to the forward portion of the fuselage, and the hook 36 is fixed to the tail portion of the airplane.

The vertical support 12 is shown in FIG. 1 as being fixed to a table 38, which table is at a convenient height for the toy. The fixed vertical support includes a C-member 40, which has press fitted therein a support rod 42. The support rod has a plurality of notches 44 to receive the support line 14. A conventional thumbscrew 45 is threadedly mounted in the C-member 40 and is in engagement with the table to hold the C-member in position.

Mounted on the support rod 42 is a vehicle catch 46. The vehicle catch 46 is a wire member having a looped portion 48, which resiliently engages the support rod 42. A pair of oppositely extending branches 50 and 52 are formed integral with the loops, and a pair of identical cantilever arms 54 and 56 are formed integral with the branches 50 and 52, respectively. The cantilever arms 54 and 56 have hooks 58 and 60 formed integral with their respective free ends. As may be seen in FIGS. 5 and 8, the cantilever arms 54 and 56 slope downwardly from the support rod 52. The arms 54 and 56 are spaced to receive the tail portion of the fuselage of model airplane 20 therebetween. The horizontal stabilizer 28 of the model airplane engages the arms and is prevented from slipping off the arms by hooks 58 and 60.

The support line 14, which in this instance is a monofilament nylon line, has one end fixed to the support rod 42 and is positioned in an appropriate notch 44. The other end of the line, as was mentioned above, is fixed to the movable support 16. The diameter of the monofilament line is equal to or less than the diameter of the wire forming the hooks 34 and 36, which allows the hooks to slide freely along the line. Should there be any nicks in the line, the larger diameter wire slides over the nicks.

The movable vertical support 16 includes a base 62, a ball 64, a clamp 66 movably holding the ball on the base, and a stick 68 having one end fixed to the ball. The base 62 is a cardboard sheet, which includes a bottom panel 70. A vertical panel 72 is formed integral with the bottom panel 70 and with an instrument panel 74. The instrument panel 74 is appropriately marked with instruments, which may contain dials which may be adjusted as required to simulate an actual airplane cockpit. A flap 76 is formed integral with the instrument panel and is parallel to the bottom panel.

The clamp 66 is generally U-shaped and includes a platform 78 with a pair of sidewalls 80 formed integrally therewith. Each of the sidewalls 80 has an integral ear 82 extending outward to provide a means for securing the clamp to the base. The platform 78 has a circular opening 84 in the center thereof. The opening has a diameter slightly less than the ball 64 so that the ball is retained by the platform but is free to rotate in any direction. A plurality of bolts 86 extend through the ears 82 and through the bottom panel 70 and the flap 76, which bolts hold the portions of the base together to prevent the base from coming apart.

A pair of notches 90 are found in the stick to receive the support line 14. The support line is tied to the stick at the upper notch, as is shown in FIG. 6. However, the line 14 may be tied to the lower notch as is required for a given arrangement.

The landing strip 18 in this instance is a simulated aircraft carrier. However, the various markings delineating the island and guns of the aircraft carrier are not shown herein. The landing strip is a sheet of paperboard 92. However, the landing strip does include an arrester 94, which simulates an actual aircraft arrester on an aircraft carrier. The arrester 94 is a length of string 96 which passes through a pair of eyes in the paperboard 92, and a weight 98 is fixed to each of the opposite ends of string 92. When the hook 32 of the model airplane engages the string 96, the string is pulled out and the weights 98 provide a drag to bring the model airplane to a slow stop in much the same way that an arrester operates on an aircraft carrier.

The toy 10 is set up for operation by attaching the fixed vertical support 12 to the table 38, and the movable vertical support 16 is spaced from the fixed vertical support and positioned below the fixed vertical support. The support line is attached to the support rod 42 and to the stick 68. It has been found that the toy operates best if the height to distance ratio is approximately 1 to 10, that is, the difference between the height of the upper portion of the support line and the lower portion of the support line relative to the horizontal distance between the ends of the support line is 1 foot of vertical distance for every 10 feet of horizontal distance.

The model airplane has the hooks 34 and 36 in engagement with the line 14. The operator places the horizontal stabilizer in engagement with the cantilever arms 54 and 56 so that the leading edge of the horizontal stabilizer engages the hooks 58 and 60. The line 14 is left slack, and the model airplane 20 simply hangs in position, as shown in solid form in FIG. 5. The operator then pulls back on the stick to make the line taut. As the line is made taut, the hook 34 is lifted to level out the airplane, as shown in dotted form in FIG. 5. The tautness of the line tends to lift the hook 36 so that the horizontal stabilizer of the model airplane then slides over the hooks 58 and 60 and slides along the line 14.

The rate of descent is controlled by the operator. As the stick 68 is moved forward, the line is slackened, and the nose of the plane is allowed to go down, which also increases the speed of the model airplane just as occurs in landing a real airplane. When the operator pulls back on the stick, the line 14 is made taut, the nose of the plane is raised slightly, and the plane slows down. Again, the operation is identical to the operation of a real plane during a landing. As the model airplane descends, the wings provide some lift to the model so that friction between the line 14 and hooks 34 and 36 is at a minimum and the model is partially flying with the string providing guidance to the model. The operator may also move the stick 68 from side to side to simulate sidewise movement of an airplane. The operator must exercise a degree of skill and judgment in order to guide the model airplane to a touchdown on the paperboard 92 so that the model airplane touches down in front of the string 96, thereby allowing the hook 32 to engage the string and prevent further roll of the model airplane. It may be appreciated that if the model airplane touches down too soon, it is an equivalence of landing in the water. If the touchdown is too late, the airplane 20 overshoots the string 96 and the plane then rolls off the end of the strip 18.

Takeoffs may be simulated by positioning the fixed vertical support below the movable vertical support. The stick is placed in a forward position, and the operator pulls back on the stick to cause the plane to move down the landing surface and leave the landing surface.

It may be appreciated that a longer landing surface may be provided to simulate an airport on the ground, and the arrester 94 need not be used. FIG. 3 shows a construction of a landing strip which does not utilize an arrester. However, a simulated obstruction is provided, which again simulates certain actual landing conditions. All of the parts of the toy shown in FIG. 3 are identical to the parts described above, with the exception of the specific construction of the model airplane and the landing surface. The toy shown in FIG. 3 includes a model airplane 120, which is identical in construction to the model airplane 20, with the exception that a skid 122 is provided rather than a hook 32. The remainder of the parts are identical to the parts of the aforementioned device. The toy shown in FIG. 3 includes a landing surface 118 rather than the surface 18. The landing surface 118 includes a landing strip 124, which is a painted pressboard surface, and a plurality of simulated trees 126 are mounted on the end of the pressboard surface adjacent to the fixed vertical support so that the simulated trees provide an obstacle to the model airplane as it glides from the fixed vertical support toward the movable vertical support.

The operation of the toy shown in FIG. 3 is substantially identical to the toy 10 described above. The model airplane 120 is released in the same manner as described above. However, as the toy slides down the support line 14 toward the simulated trees 126 which provide an obstruction to the landing surface, the operator must pull back on the stick 68 in order to make the line 14 taut so that the model plane rises over the obstruction. The operator then must slacken the line in order to have the plane drop down. Otherwise, the model airplane will overshoot the landing surface. Thus, the operator must exercise a certain amount of skill and judgment in landing the model airplane.

Although two specific embodiments of the herein disclosed invention have been shown and described in detail, it is readily apparent that those skilled in the art may make various modifications and changes in the subject invention without departing from the spirit and scope of the present invention. There may be changes made in the specific vehicle and the specific arrangement of the various parts without departing from the scope of the present invention. It is to be expressly understood that the instant invention is limited only to the appended claims, and the foregoing description is provided herein in accordance with the requirements of the applicable Patent Act to set forth the best mode of practicing the invention.

What is claimed is:

1. A toy comprising, in combination, a support line having one end fixed at a given height, a vehicle having a support movably engaging the support line and being supported thereby, a movable vertical support connected to the other end of the support line at a second given height for adjusting the slack of the support line to regulate the rate of descent of the vehicle along the support line, and a landing surface positioned below a portion of the support line engageable with the vehicle, whereby manipulation of the movable vertical support provides a control for the rate of vertical movement of the vehicle.

2. A toy as defined in claim 1 wherein the support line is a monofilament line.

3. A toy as defined in claim 2 wherein the vehicle support is a pair of longitudinally spaced wire hooks engageable with the monofilament line.

4. A toy as defined in claim 3 wherein the diameter of the wire of the hooks is not less than the diameter of the monofilament line.

5. A toy as defined in claim 4 including a fixed vertical support connected to the one end of the support line, said one end of the support line being spaced horizontally from the movable vertical support a distance 10 times greater than the difference in height between the one end of the support line and the other end of the support line, and a vehicle catch mounted on the vertical support and engageable with the vehicle to hold releasably the vehicle adjacent to the fixed vertical support.

6. A toy as defined in claim 1 including, a fixed vertical support connected to one end of the support line, a vehicle catch mounted on the vertical support and engageable with the vehicle to hold releasably the vehicle adjacent to the fixed vehicle support, and an arrester mounted on the landing surface engageable with the vehicle to stop the vehicle.

7. A toy as defined in claim 1 including, a fixed vertical support connected to the one end of the support line and a vehicle catch mounted on the vertical support and engageable with the vehicle to hold releasably the vehicle adjacent to the fixed vertical support, whereby the vehicle is releasable from the vehicle catch by movement of the movable vertical support to increase the tautness of the support line.

8. A toy as defined in claim 1 including an arrester mounted on the landing surface engageable with the vehicle to stop the vehicle.

9. A toy as defined in claim 1 including an obstacle positioned below the support line adjacent to the landing surface in the path of the vehicle, whereby the movable vertical support must be appropriately adjusted to raise the vehicle over the obstacle prior to engagement with the landing surface.

10. A toy as defined in claim 1 including, a fixed vertical support connected to one end of the support line, a vehicle catch mounted on the vertical support and engageable with the vehicle to hold releasably the vehicle adjacent to the fixed vertical support, and an obstacle positioned below the support line and between the end of the landing surface and the fixed vertical support, whereby the movable vertical support must be appropriately adjusted during the descent of the vehicle to raise the vehicle over the obstacle prior to engagement with the landing surface.